US009779775B2

(12) United States Patent
Pacurariu et al.

(10) Patent No.: US 9,779,775 B2
(45) Date of Patent: Oct. 3, 2017

(54) AUTOMATIC GENERATION OF COMPILATION VIDEOS FROM AN ORIGINAL VIDEO BASED ON METADATA ASSOCIATED WITH THE ORIGINAL VIDEO

(71) Applicant: LYVE MINDS, INC., Cupertino, CA (US)

(72) Inventors: Mihnea Calin Pacurariu, Cupertino, CA (US); Andreas von Sneidern, Cupertino, CA (US); Kevin Arnold, Cupertino, CA (US); Greg Smelzer, Cupertino, CA (US); Jeff Ma, Cupertino, CA (US)

(73) Assignee: LYVE MINDS, INC., Cupertino, CA (US)

( * ) Notice: Subject to any disclaimer, the term of this patent is extended or adjusted under 35 U.S.C. 154(b) by 93 days.

(21) Appl. No.: 14/188,431

(22) Filed: Feb. 24, 2014

(65) Prior Publication Data

US 2015/0243326 A1  Aug. 27, 2015

(51) Int. Cl.
*H04N 1/40* (2006.01)
*H04N 19/00* (2014.01)
(Continued)

(52) U.S. Cl.
CPC ...... *G11B 27/031* (2013.01); *G06F 17/30781* (2013.01); *G06F 17/30784* (2013.01);
(Continued)

(58) Field of Classification Search
CPC .. G06F 17/30017; G11B 27/034; G11B 27/34
(Continued)

(56) References Cited

U.S. PATENT DOCUMENTS

| 2004/0027369 A1 * | 2/2004 | Kellock | ................ G11B 27/34 715/716 |
| 2008/0019661 A1 * | 1/2008 | Obrador | ............... G11B 27/034 386/210 |

(Continued)

FOREIGN PATENT DOCUMENTS

WO  WO-2015127385 A1  8/2015

OTHER PUBLICATIONS

Title: Ken Burns effect, Publisher: Wikipedia, the free encyclopedia, URL Link: https://en.wikipedia.org/wiki/Ken_Burns_effect, Date Last Modified: Feb. 1, 2016.*

(Continued)

*Primary Examiner* — Cesar Paula
*Assistant Examiner* — Luu-Phuong Nguyen
(74) *Attorney, Agent, or Firm* — Schwegman Lundberg & Woessner, P.A.

(57) ABSTRACT

Embodiments described herein include systems and methods for automatically creating compilation videos from an original video based on metadata associated with the original video. For example, a method for creating a compilation video may include determining a relevance score for video frames in an original video; selecting a plurality of relevant video frames from the original video based on the relevance score; selecting a plurality of video clips from the original video based on the relevance scores of the video frames; and creating a compilation video from the plurality of video clips. Each of the plurality of video clips, for example, may include at least one relevant video frame from the plurality of relevant video frames.

18 Claims, 10 Drawing Sheets

(51) Int. Cl.
*H04N 21/00* (2011.01)
*H04N 21/23* (2011.01)
*H04N 21/44* (2011.01)
*G11B 27/031* (2006.01)
*G06K 9/00* (2006.01)
*G06F 17/30* (2006.01)

(52) U.S. Cl.
CPC .. *G06F 17/30787* (2013.01); *G06F 17/30793* (2013.01); *G06F 17/30811* (2013.01); *G06K 9/00221* (2013.01); *G06K 9/00268* (2013.01); *G06K 9/00711* (2013.01); *G06K 9/00718* (2013.01); *G06K 9/00744* (2013.01)

(58) Field of Classification Search
USPC .......................................................... 715/202
See application file for complete search history.

(56) References Cited

U.S. PATENT DOCUMENTS

| 2008/0101762 A1* | 5/2008 | Kellock | G11B 27/031 386/278 |
| 2010/0220197 A1* | 9/2010 | Dukellis | G06Q 30/0253 348/207.1 |
| 2011/0047163 A1 | 2/2011 | Chechik et al. | |
| 2011/0161348 A1 | 6/2011 | Oron | |
| 2012/0059826 A1 | 3/2012 | Mate et al. | |
| 2012/0095817 A1* | 4/2012 | Kamil | G06Q 30/0241 705/14.4 |
| 2014/0023348 A1 | 1/2014 | O'kelly et al. | |
| 2015/0156548 A1* | 6/2015 | Sirpal | H04N 21/4858 725/47 |
| 2016/0071549 A1 | 3/2016 | von Sneidern et al. | |
| 2016/0080835 A1 | 3/2016 | von Sneidern et al. | |

OTHER PUBLICATIONS

U.S. Appl. No. 14/941,285, filed Nov. 13, 2015, Synopsis Video Creation Based on Video Metadata.
U.S. Appl. No. 14/941,293, filed Nov. 13, 2015, Synopsis Video Creation Based on Relevance Score.
"International Application Serial No. PCT/US2015/017141, International Preliminary Report on Patentability dated Sep. 9, 2016", 11 pgs.
"International Application Serial No. PCT/US2015/017141, International Search Report dated May 12, 2015", 3 pgs.
"International Application Serial No. PCT/US2015/017141, Written Opinion dated May 12, 2015", 9 pgs.

* cited by examiner

AUTOMATIC GENERATION OF COMPILATION VIDEOS FROM AN ORIGINAL VIDEO BASED ON METADATA ASSOCIATED WITH THE ORIGINAL VIDEO

FIELD

This disclosure relates generally to automatic generation of compilation videos.

BACKGROUND

Digital video is becoming as ubiquitous as photographs. The reduction in size and the increase in quality of video sensors have made video cameras more and more accessible for any number of applications. Mobile phones with video cameras are one example of video cameras being more accessible and usable. Small portable video cameras that are often wearable are another example. The advent of YouTube, Instagram, and other social networks has increased users' ability to share video with others.

SUMMARY

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

Embodiments described herein include systems and methods for automatically creating compilation videos from an original video based on metadata associated with the original video. For example, a method for creating a compilation video may include determining a relevance score for video frames in an original video; selecting a plurality of relevant video frames from the original video based on the relevance score; selecting a plurality of video clips from the original video based on the relevance scores of the video frames; and creating a compilation video from the plurality of video clips. Each of the plurality of video clips, for example, may include at least one relevant video frame from the plurality of relevant video frames.

In some embodiments the original video may include two or more original videos. Each of the plurality of relevant video frames may be selected from one of the two or more original videos, and/or each of the video clips are selected from one of the two or more original video clips. In some embodiments, the method may include outputting the compilation video from a video camera. In some embodiments, each of the plurality of video clips may include video frames positioned either or both before and after the corresponding relevant video frame. In some embodiments, the method may also include receiving the original video; and receiving video metadata associated with the original video, wherein the relevance score is determined based on the video metadata. In some embodiments, the relevance score may be determined based on one or more data items selected from the list consisting of geolocation data, motion data, people tag data, voice tag data, motion tag data, time data, and audio data.

In some embodiments, the method may also include receiving a digital audio file that includes a song, wherein the compilation video is created having a length that is the same length as the length of the song. In some embodiments the relevance score is based on the similarity of voice tags associated with video frames and lyrics in the song.

In some embodiments, the method may also include determining a compilation video length; and adjusting the length of the plurality of video clips based on the compilation video length.

A camera is also provided according to some embodiments described herein. The camera may include an image sensor; a memory; and a processing unit electrically coupled with the image sensor, and the memory. The processing unit may be configured to record an original video using the image sensor wherein the original video may include a plurality of video frames; store the original video in the memory; determine a relevance score for the video frames in the original video; select a plurality of the video frames from the original video based on the relevance score; select a plurality of video clips from the original video based on the plurality of video frames, wherein each of the plurality of video clips may include at least one video frame from the plurality of video frames; and create a compilation video from the plurality of video clips.

In some embodiments, the camera may include a motion sensor. The relevance score, for example, may be based on motion data received from the motion sensor. In some embodiments, the camera may include a GPS sensor. The relevance score, for example, may be based on GPS data received from the GPS sensor.

In some embodiments, the processing unit may be further configured to record video metadata associated with the original video, wherein the relevance score is determined based on the video metadata. In some embodiments, the relevance score may be determined based on one or more data items selected from the list consisting of geolocation data, motion data, people tag data, voice tag data, motion tag data, time data, and audio data.

In some embodiments, the processing unit may be further configured to receive a digital audio file that may include a song, wherein the compilation video is created having a length that is the same length as the length of the song. In some embodiments, the relevance score is based on the similarity of voice tags associated with video frames and lyrics in the song.

Embodiments of the invention also include a method for creating a compilation video. The method may include determining a first relevance score for a first video frame in an original video; determining a second relevance score for a second video frame in the original video; selecting a first video clip that may include a plurality of continuous video frames of the original video, wherein the first video clip includes the first video frame; selecting a second video clip that may include a plurality of continuous video frames of the original video, wherein the second video clip includes the second video frame; and creating a compilation video comprising the first video clip and the second video clip.

In some embodiments, the relevance score may be determined based on one or more data items selected from the list consisting of geolocation data, motion data, people tag data, voice tag data, motion tag data, time data, and audio data. In some embodiments, the method may also include determining a relevance score for each of a plurality of video frames of the original video such that the first relevance score and the second relevance score are greater than a majority of the relevance scores of the plurality of video frames.

In some embodiments, the method may also include determining a compilation video length; and adjusting the length of either or both the first video clip and the second video clip based on the compilation video length. In some embodiments, the first video clip may include a plurality of video frames positioned either or both before and after the first video frame; and the second video clip may include a plurality of video frames positioned either or both before and after the second video frame.

In some embodiments, the original video may include metadata. And the first relevance score may be determined from the metadata and the second relevance score may be determined from the second metadata. In some embodiments, the original video may include an original first video and an original second video. The first video clip may include a plurality of continuous video frames of the first original video, and the second video clip may include a plurality of continuous video frames of the second original video.

BRIEF DESCRIPTION OF THE FIGURES

These and other features, aspects, and advantages of the present disclosure are better understood when the following Detailed Description is read with reference to the accompanying drawings.

DETAILED DESCRIPTION

Embodiments described herein include methods and/or systems for creating a compilation video from one or more original videos. A compilation video is a video that includes more than one video clip selected from portions of one or more original video(s) and joined together to form a single video. A compilation video may also be created based on the relevance of metadata associated with the original videos. The relevance may indicate, for example, the level of excitement occurring with the original video as represented by motion data, the location where the original video was recorded, the time or date the original video was recorded, the words used in the original video, the tone of voices within the original video, and/or the faces of individuals within the original video, among others.

An original video is a video or a collection of videos recorded by a video camera or multiple video cameras. An original video may include one or more video frames (a single video frame may be a photograph) and/or may include metadata such as, for example, the metadata shown in the data structures illustrated in FIG. 2 and FIG. 3. Metadata may also include other data such as, for example, a relevance score.

A video clip is a collection of one or more continuous or contiguous video frames of an original video. A video clip can include a single video frame and may be considered a photo or an image. A compilation video is a collection of one or more video clips that are combined into a single video.

In some embodiments, a compilation video may be automatically created from one or more original videos based on relevance scores associated with the video frames within the one or more original videos. For instance, the compilation video may be created from video clips having video frames with the highest or high relevance scores. Each video frame of an original video or selected portions of an original video may be given a relevance score based on any type of data. This data may be metadata collected when the video was recorded or created from the video (or audio) during post processing. The video clips may then be organized into a compilation video based on these relevance scores.

In some embodiments, a compilation video may be created for each original video recorded by a camera. These compilation videos, for example, may be used for preview purposes like an image thumbnail and/or the length of each of the compilation videos may be shorter than the length of each of the original videos.

Figure 1:
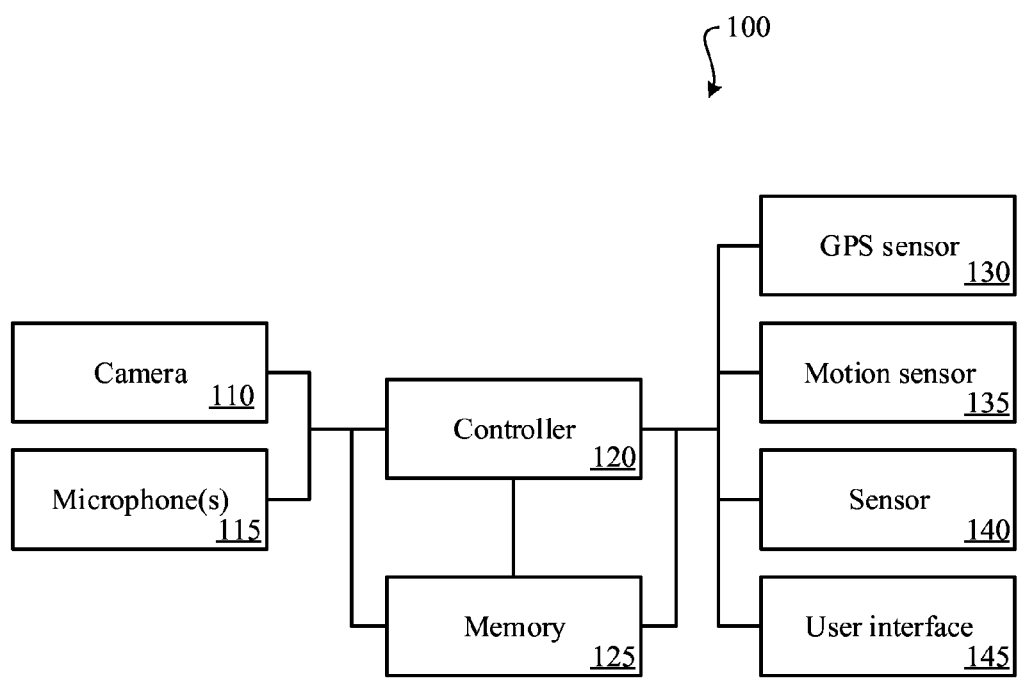
FIG. 1 illustrates an example camera system according to some embodiments described herein.

FIG. 1 illustrates an example block diagram of a camera system 100 that may be used to record original video and/or create compilation videos based on the original video according to some embodiments described herein. The camera system 100 includes a camera 110, a microphone 115, a controller 120, a memory 125, a GPS sensor 130, a motion sensor 135, sensor(s) 140, and/or a user interface 145. The controller 120 may include any type of controller, processor, or logic. For example, the controller 120 may include all or any of the components of a computational system 1000 shown in FIG. 10. The camera system 100 may be a smartphone or tablet.

The camera 110 may include any camera known in the art that records digital video of any aspect ratio, size, and/or frame rate. The camera 110 may include an image sensor that samples and records a field of view. The image sensor, for example, may include a CCD or a CMOS sensor. For example, the aspect ratio of the digital video produced by the camera 110 may be 1:1, 4:3, 5:4, 3:2, 16:9, 10:7, 9:5, 9:4, 17:6, etc., or any other aspect ratio. As another example, the size of the camera's image sensor may be 9 megapixels, 15 megapixels, 20 megapixels, 50 megapixels, 100 megapixels, 200 megapixels, 500 megapixels, 1000 megapixels, etc., or any other size. As another example, the frame rate may be 24 frames per second (fps), 25 fps, 30 fps, 48 fps, 50 fps, 72 fps, 120 fps, 300 fps, etc., or any other frame rate. The frame rate may be an interlaced or progressive format. Moreover, the camera 110 may also, for example, record 3-D video. The camera 110 may provide raw or compressed video data. The video data provided by the camera 110 may include a series of video frames linked together in time. Video data may be saved directly or indirectly into the memory 125.

The microphone 115 may include one or more microphones for collecting audio. The audio may be recorded as mono, stereo, surround sound (any number of tracks), Dolby, etc., or any other audio format. Moreover, the audio may be compressed, encoded, filtered, compressed, etc. The audio data may be saved directly or indirectly into the memory 125. The audio data may also, for example, include any number of tracks. For example, for stereo audio, two tracks may be used. And, for example, surround sound 5.1 audio may include six tracks.

The controller 120 may be communicatively coupled with the camera 110 and the microphone 115 and/or may control the operation of the camera 110 and the microphone 115. The controller 120 may also be used to synchronize the audio data and the video data. The controller 120 may also perform various types of processing, filtering, compression, etc. of video data and/or audio data prior to storing the video data and/or audio data into the memory 125.

The GPS sensor 130 may be communicatively coupled (either wirelessly or wired) with the controller 120 and/or the memory 125. The GPS sensor 130 may include a sensor that may collect GPS data. In some embodiments, the GPS data may be sampled and saved into the memory 125 at the same rate as the video frames are saved. Any type of the GPS sensor may be used. GPS data may include, for example, the latitude, the longitude, the altitude, a time of the fix with the satellites, a number representing the number of satellites used to determine GPS data, the bearing, and speed. The GPS sensor 130 may record GPS data into the memory 125. For example, the GPS sensor 130 may sample GPS data at the same frame rate as the camera records video frames and the GPS data may be saved into the memory 125 at the same rate. For example, if the video data is recorded at 24 fps, then the GPS sensor 130 may be sampled and stored 24 times a second. Various other sampling times may be used. Moreover, different sensors may sample and/or store data at different sample rates.

The motion sensor 135 may be communicatively coupled (either wirelessly or wired) with the controller 120 and/or the memory 125. The motion sensor 135 may record motion data into the memory 125. The motion data may be sampled and saved into the memory 125 at the same rate as video frames are saved in the memory 125. For example, if the video data is recorded at 24 fps, then the motion sensor may be sampled and stored in data 24 times a second.

The motion sensor 135 may include, for example, an accelerometer, gyroscope, and/or a magnetometer. The motion sensor 135 may include, for example, a nine-axis sensor that outputs raw data in three axes for each individual sensor: acceleration, gyroscope, and magnetometer, or it can output a rotation matrix that describes the rotation of the sensor about the three Cartesian axes. Moreover, the motion sensor 135 may also provide acceleration data. The motion sensor 135 may be sampled and the motion data saved into the memory 125.

Alternatively, the motion sensor 135 may include separate sensors such as a separate one-, two-, or three-axis accelerometer, a gyroscope, and/or a magnetometer. The raw or processed data from these sensors may be saved in the memory 125 as motion data.

The sensor(s) 140 may include any number of additional sensors communicatively coupled (either wirelessly or wired) with the controller 120 such as, for example, an ambient light sensor, a thermometer, barometric pressure, heart rate, pulse, etc. The sensor(s) 140 may be communicatively coupled with the controller 120 and/or the memory 125. The sensor(s), for example, may be sampled and the data stored in the memory at the same rate as the video frames are saved or lower rates as practical for the selected sensor data stream. For example, if the video data is recorded at 24 fps, then the sensor(s) may be sampled and stored 24 times a second and GPS may be sampled at 1 fps.

The user interface 145 may be communicatively coupled (either wirelessly or wired) and may include any type of input/output device including buttons and/or a touchscreen. The user interface 145 may be communicatively coupled with the controller 120 and/or the memory 125 via wired or wireless interface. The user interface may provide instructions from the user and/or output data to the user. Various user inputs may be saved in the memory 125. For example, the user may input a title, a location name, the names of individuals, etc. of an original video being recorded. Data sampled from various other devices or from other inputs may be saved into the memory 125. The user interface 145 may also include a display that may output one or more compilation videos.

Figure 2:
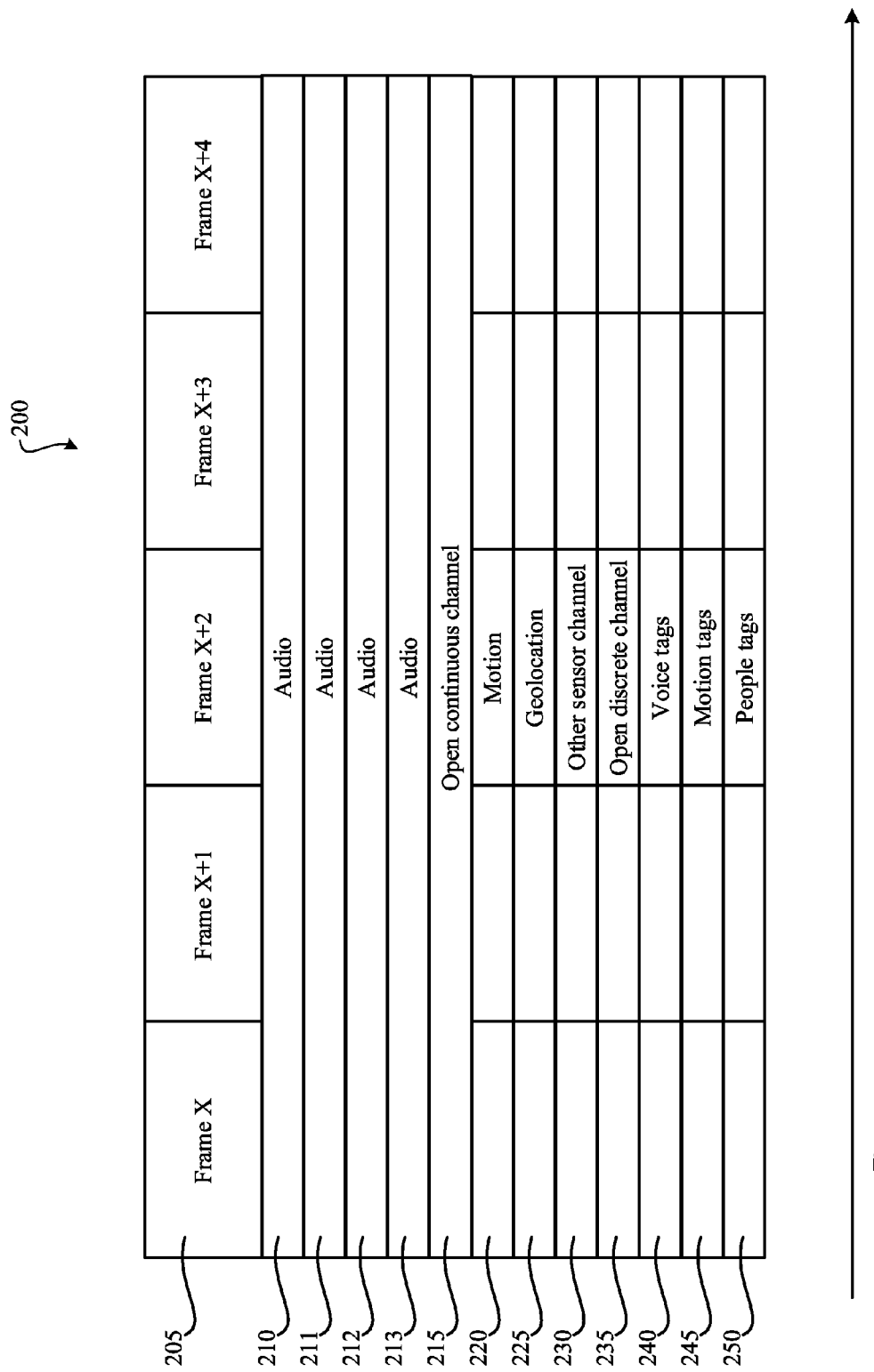
FIG. 2 illustrates an example data structure according to some embodiments described herein.

FIG. 2 is an example diagram of a data structure 200 for video data that includes video metadata that may be used to create compilation videos according to some embodiments described herein. The data structure 200 shows how various components are contained or wrapped within the data structure 200. In FIG. 2, time runs along the horizontal axis and video, audio, and metadata extends along the vertical axis. In this example, five video frames 205 are represented as Frame X, Frame X+1, Frame X+2, Frame X+3, and Frame X+4. These video frames 205 may be a small subset of a much longer video clip. Each video frame 205 may be an image that when taken together with the other video frames 205 and played in a sequence comprises a video clip.

The data structure 200 may also include four audio tracks 210, 211, 212, and 213. Audio from the microphone 115 or other source may be saved in the memory 125 as one or more of the audio tracks. While four audio tracks are shown, any number may be used. In some embodiments, each of these audio tracks may comprise a different track for surround sound, for dubbing, etc., or for any other purpose. In some embodiments, an audio track may include audio received from the microphone 115. If more than one of the microphones 115 is used, then a track may be used for each microphone. In some embodiments, an audio track may include audio received from a digital audio file either during post processing or during video capture.

The audio tracks 210, 211, 212, and 213 may be continuous data tracks according to some embodiments described herein. For example, the video frames 205 are discrete and have fixed positions in time depending on the frame rate of the camera. The audio tracks 210, 211, 212, and 213 may not be discrete and may extend continuously in time as shown. Some audio tracks may have start and stop periods that are not aligned with the video frames 205 but are continuous between these start and stop times.

An open track 215 is a track that may be reserved for specific user applications according to some embodiments described herein. The open track 215 in particular may be a continuous track. Any number of open tracks may be included within the data structure 200.

A motion track 220 may include motion data sampled from the motion sensor 135 according to some embodiments described herein. The motion track 220 may be a discrete track that includes discrete data values corresponding with each video frame 205. For instance, the motion data may be sampled by the motion sensor 135 at the same rate as the frame rate of the camera and stored in conjunction with the video frames 205 captured while the motion data is being sampled. The motion data, for example, may be processed prior to being saved in the motion track 220. For example, raw acceleration data may be filtered and or converted to other data formats.

The motion track 220, for example, may include nine sub-tracks where each sub-track includes data from a nine-axis accelerometer-gyroscope sensor according to some embodiments described herein. As another example, the motion track 220 may include a single track that includes a rotational matrix. Various other data formats may be used.

A geolocation track 225 may include location, speed, and/or GPS data sampled from the GPS sensor 130 according to some embodiments described herein. The geolocation track 225 may be a discrete track that includes discrete data values corresponding with each video frame 205. For instance, the motion data may be sampled by the GPS sensor 130 at the same rate as the frame rate of the camera and stored in conjunction with the video frames 205 captured while the motion data is being sampled.

The geolocation track 225, for example, may include three sub-tracks where each sub-track represents the latitude, longitude, and altitude data received from the GPS sensor 130. As another example, the geolocation track 225 may include six sub-tracks where each sub-track includes three-dimensional data for velocity and position. As another example, the geolocation track 225 may include a single track that includes a matrix representing velocity and location. Another sub-track may represent the time of the fix with the satellites and/or a number representing the number of satellites used to determine GPS data. Various other data formats may be used.

Another sensor track 230 may include data sampled from the sensor 140 according to some embodiments described herein. Any number of additional sensor tracks may be used. The other sensor track 230 may be a discrete track that includes discrete data values corresponding with each video frame 205. The other sensor track may include any number of sub-tracks.

An open discrete track 235 is an open track that may be reserved for specific user or third-party applications according to some embodiments described herein. The open discrete track 235 in particular may be a discrete track. Any number of open discrete tracks may be included within the data structure 200.

A voice tagging track 240 may include voice-initiated tags according to some embodiments described herein. The voice tagging track 240 may include any number of sub-tracks; for example, sub-track may include voice tags from different individuals and/or for overlapping voice tags. Voice tagging may occur in real time or during post processing. In some embodiments, voice tagging may identify selected words spoken and recorded through the microphone 115 and save text identifying such words as being spoken during the associated frame. For example, voice tagging may identify the spoken word "Go!" as being associated with the start of action (e.g., the start of a race) that will be recorded in upcoming video frames. As another example, voice tagging may identify the spoken word "Wow!" as identifying an interesting event that is being recorded in the video frame or frames. Any number of words may be tagged in the voice tagging track 240. In some embodiments, voice tagging may transcribe all spoken words into text and the text may be saved in the voice tagging track 240.

A motion tagging track 245 may include data indicating various motion-related data such as, for example, acceleration data, velocity data, speed data, zooming out data, zooming in data, etc. Some motion data may be derived, for example, from data sampled from the motion sensor 135 or the GPS sensor 130 and/or from data in the motion track 220 and/or the geolocation track 225. Certain accelerations or changes in acceleration that occur in a video frame or a series of video frames (e.g., changes in motion data above a specified threshold) may result in the video frame, a plurality of video frames, or a certain time being tagged to indicate the occurrence of certain events of the camera such as, for example, rotations, drops, stops, starts, beginning action, bumps, jerks, etc. Motion tagging may occur in real time or during post processing.

A people tagging track 250 may include data that indicates the names of people within a video frame as well as rectangle information that represents the approximate location of the person (or person's face) within the video frame. The people tagging track 250 may include a plurality of sub-tracks. Each sub-track, for example, may include the name of an individual as a data element and the rectangle information for the individual. In some embodiments, the name of the individual may be placed in one out of a plurality of video frames to conserve data.

The rectangle information, for example, may be represented by four comma-delimited decimal values, such as "0.25, 0.25, 0.25, 0.25." The first two values may specify the top-left coordinate; the final two specify the height and width of the rectangle. The dimensions of the image for the purposes of defining people rectangles are normalized to 1, which means that in the "0.25, 0.25, 0.25, 0.25" example, the rectangle starts ¼ of the distance from the top and ¼ of the distance from the left of the image. Both the height and width of the rectangle are ¼ of the size of their respective image dimensions.

People tagging can occur in real time as the original video is being recorded or during post processing. People tagging may also occur in conjunction with a social network application that identifies people in images and uses such information to tag people in the video frames and adding people's names and rectangle information to the people tagging track 250. Any tagging algorithm or routine may be used for people tagging.

Data that includes motion tagging, people tagging, and/or voice tagging may be considered processed metadata. Other tagging or data may also be processed metadata. Processed metadata may be created from inputs, for example, from sensors, video, and/or audio.

In some embodiments, discrete tracks (e.g., the motion track 220, the geolocation track 225, the other sensor track 230, the open discrete track 235, the voice tagging track 240, the motion tagging track 245, and/or the people tagging track 250) may span more than video frame. For example, a single GPS data entry may be made in the geolocation track 225 that spans five video frames in order to lower the amount of data in the data structure 200. The number of video frames spanned by data in a discrete track may vary based on a standard or be set for each video segment and indicated in metadata within, for example, a header.

Various other tracks may be used and/or reserved within the data structure 200. For example, an additional discrete or continuous track may include data specifying user information, hardware data, lighting data, time information, temperature data, barometric pressure, compass data, clock, timing, time stamp, etc.

Although not illustrated, the audio tracks 210, 211, 212, and 213 may also be discrete tracks based on the timing of each video frame. For example, audio data may also be encapsulated on a frame-by-frame basis.

Figure 3:
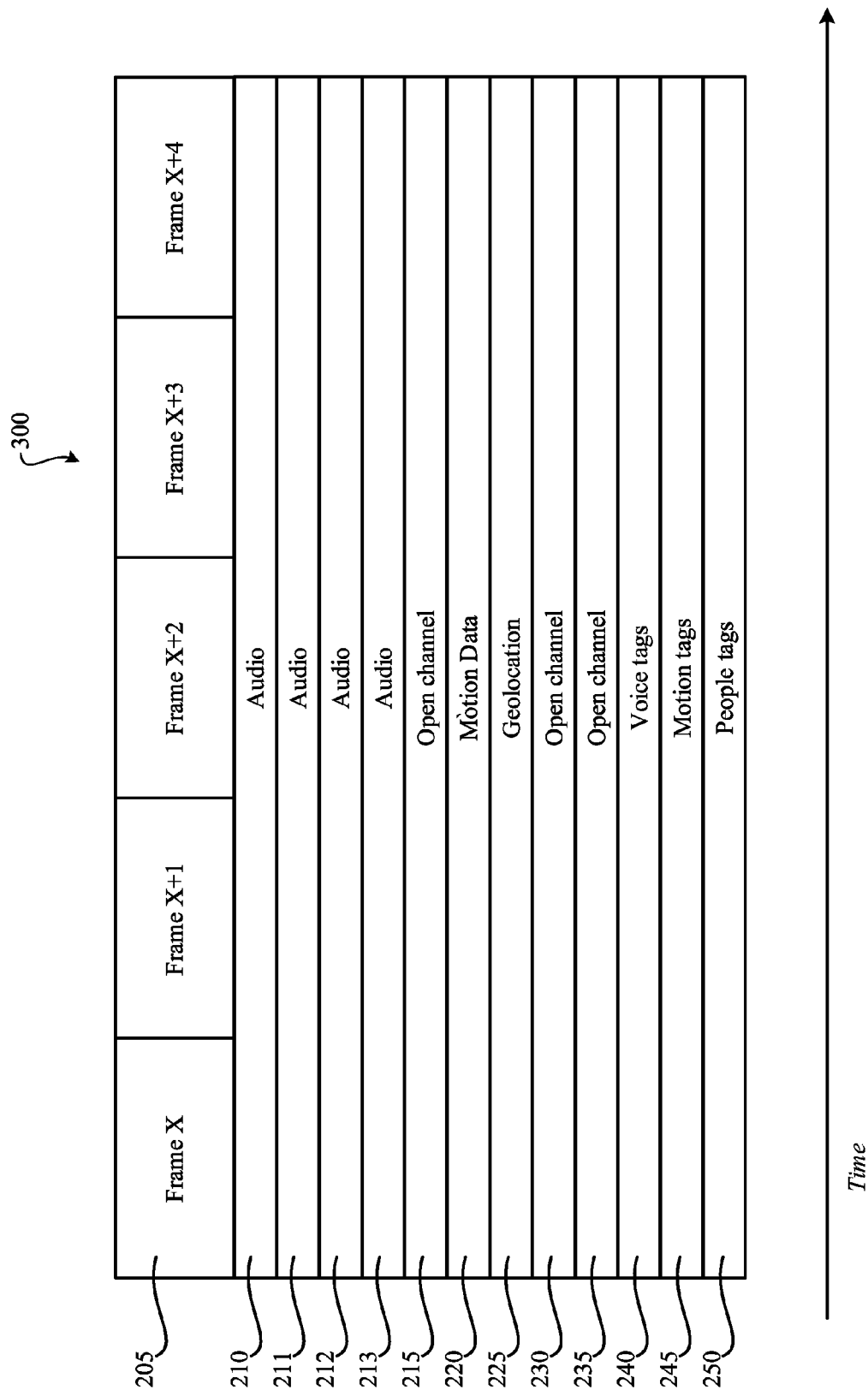
FIG. 3 illustrates an example data structure according to some embodiments described herein.

FIG. 3 illustrates a data structure 300, which is somewhat similar to the data structure 200, except that all data tracks are continuous tracks according to some embodiments described herein. The data structure 300 shows how various components are contained or wrapped within the data structure 300. The data structure 300 includes the same tracks. Each track may include data that is time stamped based on the time the data was sampled or the time the data was saved as metadata. Each track may have different or the same sampling rates. For example, motion data may be saved in the motion track 220 at one sampling rate, while geolocation data may be saved in the geolocation track 225 at a different sampling rate. The various sampling rates may depend on the type of data being sampled, or set based on a selected rate.

Figure 4:
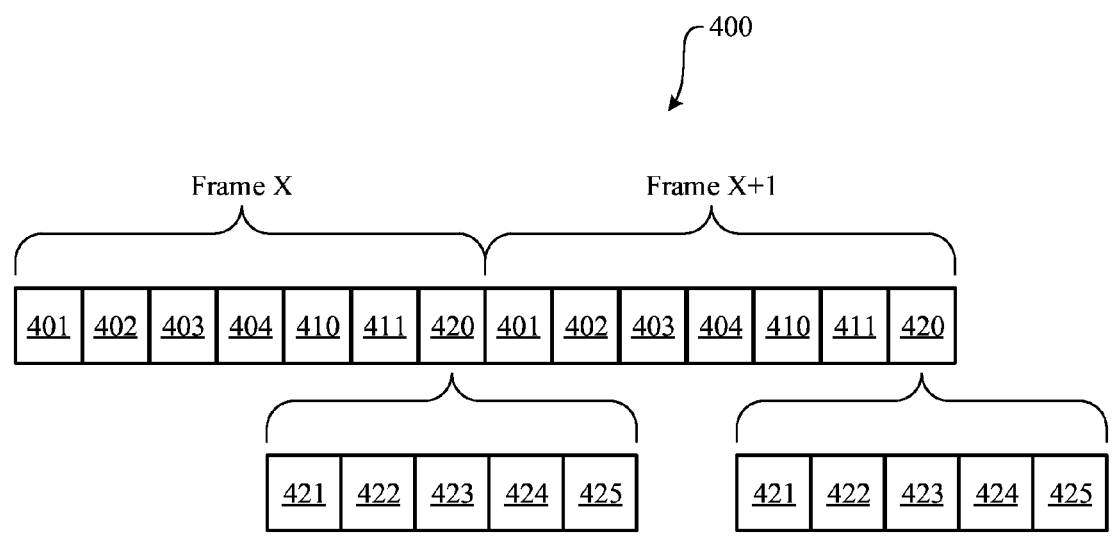
FIG. 4 illustrates another example of a packetized video data structure that includes metadata according to some embodiments described herein.

FIG. 4 shows another example of a packetized video data structure 400 that includes metadata according to some embodiments described herein. The data structure 400 shows how various components are contained or wrapped within the data structure 400. The data structure 400 shows how video, audio, and metadata tracks may be contained within a data structure. The data structure 400, for example, may be an extension and/or include portions of various types of compression formats such as, for example, MPEG-4 part 14 and/or Quicktime formats. The data structure 400 may also be compatible with various other MPEG-4 types and/or other formats.

The data structure 400 includes four video tracks 401, 402, 403, and 404, and two audio tracks 410 and 411. The data structure 400 also includes a metadata track 420, which may include any type of metadata. The metadata track 420 may be flexible in order to hold different types or amounts of metadata within the metadata track. As illustrated, the metadata track 420 may include, for example, a geolocation sub-track 421, a motion sub-track 422, a voice tag sub-track 423, a motion tag sub-track 424, and/or a people tag sub-track 425. Various other sub-tracks may be included.

The metadata track 420 may include a header that specifies the types of sub-tracks contained within the metadata track 420 and/or the amount of data contained within the metadata track 420. Alternatively and/or additionally, the header may be found at the beginning of the data structure or as part of the first metadata track.

Figure 5:
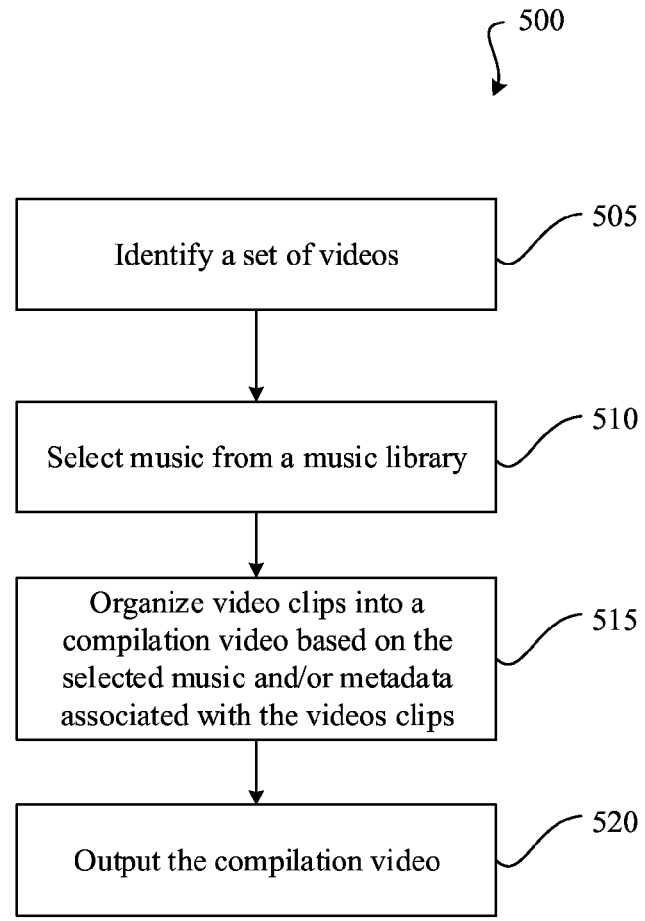
FIG. 5 illustrates an example flowchart of a process for creating a compilation video according to some embodiments described herein.

FIG. 5 illustrates an example flowchart of a process 500 for creating a compilation video from one or more original videos according to some embodiments described herein. The process 500 may be executed by the controller 120 of the camera 110 or by any computing device such as, for example, a smartphone and/or a tablet. The process 500 may start at block 505.

At block 505 a set of original videos may be identified. For example, the set of original videos may be identified by a user through a user interface. A plurality of original videos or thumbnails of the original videos may be presented to a user and the user may identify those to be used for the compilation video. In some embodiments, the user may select a folder, or playlist of videos. As another example, the original videos may be organized and presented to a user and/or identified based on metadata associated with the various original videos such as, for example, the time and/or date each of the original videos were recorded, the geographical region where each of the original videos were recorded, one or more specific words and/or specific faces identified within the original videos, whether video clips within the one or more original videos have been acted upon by a user (e.g., cropped, played, e-mailed, messaged, uploaded to a social network, etc.), the quality of the original videos (e.g., whether one or more video frames of the original videos is over or under exposed, out of focus, videos with red eye issues, lighting issues, etc.), etc. For example, any of the metadata described herein may be used. Moreover, one or more metadata may be used to identify videos. As another example, any of the parameters discussed below in conjunction with block 610 of process 600 in FIG. 6 may be used.

At block 510 a music file may be selected from a music library. For example, the original videos may be identified in block 505 from a video (or photo) library on a computer, laptop, tablet, or smartphone and the music file in block 510 may also be identified from a music library on the computer, laptop, tablet, or smartphone. The music file may be selected based on any number of factors such as, for example, a rating or a score of the music provided by the user; the number of times the music has been played; the number of times the music has been skipped; the date the music was played; whether the music was played on the same day as one or more original videos; the genre of the music; the genre of the music related to the original videos; how recent the music was last played; the length of the music; an indication of a user through the user interface, etc. Various other factors may be used to automatically select the music file.

At block 515 video clips from the original videos may be organized into a compilation video based on the selected music and/or metadata associated with the original videos. For example, one or more video clips from one or more of the original videos in the set of original videos may be copied and used as a portion of the compilation video. The one or more video clips from one or more of the original videos may be selected based on metadata. The length of the one or more video clips from one or more of the original videos may also be based on metadata. Alternatively or additionally, the length of the one or more video clips from one or more of the original videos may be based on a selected period of time. As another example, the one or more video clips may be added in an order roughly based on the time order the original videos or the video clips were recorded, and/or based on the rhythm or beat of the music. As yet another example, a relevance score of each of the original videos or each of the video clips may be used to organize the video clips that make up the compilation video. As another example, a photo may be added to the compilation video to run for a set period of time or a set number of frames. As yet another example, a series of photos may be added to the compilation video in time progression for a set period of time. As yet another example, a motion effect may be added to the photo such as, for example, Ken Burns effects, panning, and/or zooming. Various other techniques may be used to organize the video clips (and/or photos) into a compilation video. As part of organizing the compilation video, the music file may be used as part of or as all of one or more soundtracks of the compilation video.

At block 520 the compilation video may be output, for example, from a computer device (e.g., a video camera) to a video storage hub, computer, laptop, tablet, phone, server, etc. The compilation video, for example, may also be uploaded or sent to a social media server. The compilation video, for example, may also be used as a preview presented on the screen of a camera or smartphone through the user interface 145 showing what a video or videos include or represent a highlight reel of a video or videos. Various other outputs may also be used.

In some embodiments, the compilation video may be output after some action provided by the user through the user interface 145. For example, the compilation video may be played in response to a user pressing a button on a touch screen indicating that they wish to view the compilation video. Or, as another example, the user may indicate through the user interface 145 that they wish to transfer the compilation video to another device.

In some embodiments, the compilation may be output to the user through the user interface 145 along with a listing or showing (e.g., through thumbnails or descriptors) of the one or more original videos (e.g., the various video clips, video frames, and/or photos) that were used to create the compilation video. The user, through the user interface, may indicate that video clips from one or more original videos should be removed from the compilation video by making a selection through the user interface 145. When one of the video clips is deleted or removed from the compilation video, then another video clip from one or more original videos may automatically be selected based on its relevance score and used to replace the deleted video clip in the compilation video.

In some embodiments, video clips may be output at block 520 (or at any other output block described in various other processes herein) by saving a version of the compilation video to a hard drive, to the memory 125 or to a network-based storage location.

Figure 6:
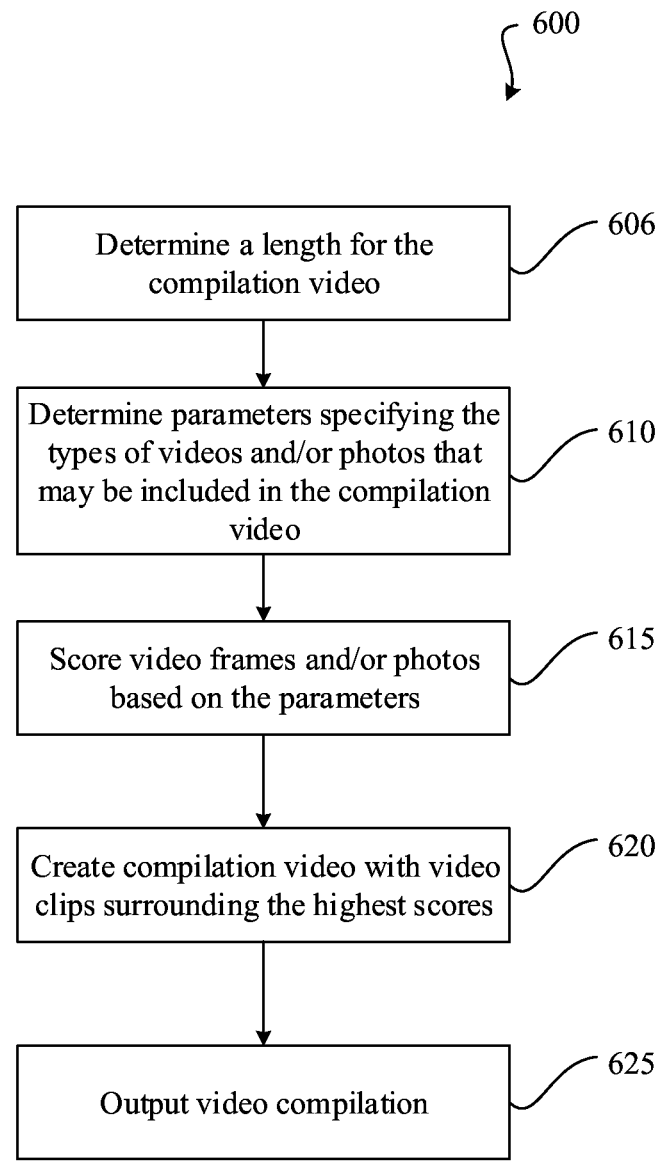
FIG. 6 illustrates an example flowchart of a process for creating a compilation video according to some embodiments described herein.

FIG. 6 illustrates an example flowchart of the process 600 for creating a compilation video from one or more original videos according to some embodiments described herein. The process 600 may be executed by the controller 120 of the camera 110 or by any computing device. The process 600 may start at block 605.

At block 605, the length of the compilation video may be determined. This may be determined in a number of different ways. For example, a default value representing the length of the compilation video may be stored in memory. As another example, the user may enter a value representing a compilation video length through the user interface 145 and have the compilation video length stored in the memory 125. As yet another example, the length of the compilation video may be determined based on the length of a song selected or entered by a user.

At block 610 parameters specifying the types of video clips (or video frames or photos) within the one or more original videos that may be included in the compilation video may be determined. And at block 615 the video clips within the original video may be given a relevance score based on the parameter(s) determined in block 610. Any number and/or type of parameter may be used. These parameters, for example, may be selected and/or entered by a user via the user interface 145.

In some embodiments, these parameters may include time or date-based parameters. For example, at block 610 a date or a date range within which video clips were recorded may be identified as a parameter. Video frames and video clips of the one or more original videos may be given a relevance score at block 615 based on the time it was recorded. The relevance score, for example, may be a binary value indicating that the video clips within the one or more original videos were taken within a time period provided by the time period parameter.

In some embodiments, the geolocation where the video clip was recorded may be a parameter identified at block 610 and used in block 615 to give a relevance score to one or more video clips of the original videos. For example, a geolocation parameter may be determined based on the average geolocation of a plurality of video clips and/or based on a geolocation valued entered by a user. The video clips within one or more original videos taken within a specified geographical region may be given a higher relevance score. As another example, if the user is recording original videos while on vacation, those original videos recorded within the geographical region around and/or near the vacation location may be given a higher relevance score. The geographical location, for example, may be determined based on geolocation data of an original video in the geolocation track 225. As yet another example, video clips within the original videos may be selected based on geographical location and a time period.

As another example, video frames within the one or more original videos may be given a relevance score based on the similarity between geolocation metadata and a geolocation parameter provided at block 610. The relevance score may be, for example, a binary value indicating that the video clips within the one or more original videos were taken within a specified geolocation provided by the geolocation parameter.

In some embodiments, motion may be a parameter identified at block 610 and used in block 615 to score video clips of the one or more original videos. A motion parameter may indicate motion indicative of high excitement occurring within a video clip. For example, a relevance score may be a value that is proportional to the amount of motion associated with the video clip. The motion may include motion metadata that can include any type of motion data. In some embodiments, video clips within the one or more original videos that are associated with higher motion metadata may be given a higher relevance score; and video clips within the one or more original videos that are associated with lower motion metadata may be given a lower relevance score. In some embodiments, a motion parameter may indicate a specific type of motion above or below a threshold value.

In some embodiments, voice tags, people tags, and/or motion tags may be a parameter identified at block 610 and used in block 615 to score the video clips within the one or more original videos. The video clips within the one or more original videos may also be determined based on any type of metadata such as, for example, based on voice tag data within the voice tagging track 240, motion data within the motion tagging track 245, and/or people tag data based on the people tagging track 250. In some embodiments, the relevance score may be a binary value indicating that the video clips within the one or more original videos are associated with a specific voice tag parameter, a specific motion, and/or include a specific person. In some embodiments, the relevance score may be related to the relative similarity of voice tags associated with the video clips within the one or more original videos with a voice tag parameter. For instance, voice tags that are the same as the voice tag parameter may be given one relevance score, and voice tags that are synonymous with the voice tag parameter may be given another, lower relevance score. Similar relevance scores may be determined for motion tags and/or people tags.

In some embodiments, a voice tag parameter may be used that associates a video clip within the one or more original videos with exclamatory words such as "sweet," "awesome," "cool," "wow," "holy cow," "no way," etc. Any number of words can be used as a parameter for a relevance score. The voice tag parameter may indicate that the video clips within the one or more original videos may be selected based on words recorded in an audio track of the original video. New or additional words may be entered by the user through the user interface 145. Moreover, new or additional words may be communicated to the camera (or another system) wirelessly through Wi-Fi or Bluetooth.

In some embodiments, a voice tone parameter may also be used that indicates voice tone within one or more of the audio tracks. The voice tone parameter may indicate that video clips within the one or more original videos may be selected based on how excited the tone of voice is in an audio track of the original video versus the words used. As another example, both the tone and the word may be used.

In some embodiments, a people tag parameter may be indicated in block 610 and used in block 615 to score the video clips within the one or more original videos. The people tag parameter can identify video clips within the one or more original videos with specific people in the video clips.

In some embodiments, video frame quality may be a parameter determined in block 610 and used in 615 for a relevance score. For example, video clips within the one or more original videos that are under exposed, over exposed, out of focus, have lighting issues, and/or have red eye issues may be given a lower score at block 615.

In some embodiments, a user action performed on video clips within the one or more original videos may be a parameter identified at block 610. For example, video clips within the one or more original videos that have been acted upon by a user such as, for example, video clips within the one or more original videos that have been edited, corrected, cropped, improved, viewed or viewed multiple times, uploaded to a social network, e-mailed, messaged, etc. may be given a higher score at block 615 than other video clips. Moreover, various user actions may result in different relevance scores.

In some embodiments, data from a social network may be used as a parameter at block 610. For example, the relevance score determined at block 615 for the video clips within the one or more original videos may depend on the number of views, "likes," and/or comments related to the video clips. As another example, the video clips may have an increased relevance score if they have been uploaded or shared on a social network.

In some embodiments, the relevance score may be determined using off-line processing and/or machine learning algorithms. Machine learning algorithms, for example, may learn which parameters within the data structure 200 or 300 are the most relevant to a user or group of users while viewing videos. This may occur, for example, by noting the number of times a video clip is watched, for how long a video clip is viewed, or whether a video clip has been shared with others. These learned parameters may be used to determine the relevance of the metadata associated with the video clips within the one or more original videos. In some embodiments, these learned parameters may be determined using another processing system or a server, and may be communicated to the camera 110 through a Wi-Fi or other connection.

In some embodiments, more than one parameter may be used to score the video clips within the one or more original videos. For example, the compilation video may be made based on people recorded within a certain geolocation and recorded within a certain time period.

At block 620, a compilation video may be created from the video clips having the metadata with the highest relevance scores. The compilation video may be created by digitally splicing copies of the video clips together. Various transitions may be used between one video clip and another. In some embodiments, video clips can be arranged in order based on the highest scores found in block 615. In other embodiments, the video clips may be placed within the compilation video in a random order. In other embodiments, the video clips may be placed within the compilation video in a time series order.

In some embodiments, metadata may be added as text to portions of the compilation video. For example, text may be added to any number of frames of the compilation video stating the people in the video clips based on information in the people tagging track 250, geolocation information based on information in the geolocation track 225, etc. In some embodiments, the text may be added at the beginning or the end. Various other metadata may also be presented as text.

In some embodiments, each video clip may be expanded to include head and/or tail video frames based on a specified head video clip length and/or a tail video clip length. The head video clip length and/or the tail video clip length may indicate, for example, the number of video frames before and/or after a selected video frame or frames that may be included as part of a video clip. For example, if the head and tail video clip length is 96 video frames (4 seconds for a video recorded with 24 frames per second), and if the parameters indicate that video frames 1004 through 1287 have a high relevance score, then the video clip may include video frames 908 through frames 1383. In this way, for example, the compilation video may include some video frames before and after the desired action. The head and tail video clip length may also be indicated as a value in seconds. Moreover, in some embodiments, a separate head video clip length and a separate tail video clip length may be used. The head and/or tail video clip length may be entered into the memory 125 via the user interface 145. Moreover, a default head and/or tail video clip length may be stored in memory.

Alternatively or additionally, a single head video clip length and/or a single tail video clip length may be used. For example, if the parameters indicate that a single video frame 1010 has a high relevance score, then a longer head and/or tail may be needed to create a video clip. If both the single head video clip length and the single tail video clip length are 60 frames, then frames 960 through 1060 may be used as the video clip. Any value may be used for the single tail video clip length and/or the single head video clip length.

Alternatively or additionally, a minimum video clip length may be used. For example, if the parameters indicate an original video clip that is less than the minimum video clip length, then additional video frames may be added before or after the original video clip length. In some cases, the original video clip may be centered within the video clip. For example, if the parameters indicate that video frames 1020 through 1080 have a high relevance score, and a minimum video clip length of 100 video frames is required, then video frames 1000 through 1100 may be used to create the video clip from the original video.

In some embodiments, each video clip being used to create the compilation video may also be lengthened to ensure that the video clip has a length above a selected and/or predetermined minimum video clip length. In some embodiments, photos may be entered into the compilation video for the minimum video clip length or another value.

At block 625, the compilation video may be output as described above in conjunction with block 520 of the process 500 shown in FIG. 5.

In some embodiments, at least a subset of the video clips used to create the compilation video may be discontinuous relative one to another in a single original video. For example, a first video clip and a second video clip may not have the same video frames. As another example, the first video clip and the second video clip may be located in different portions of the original video.

Figure 7:
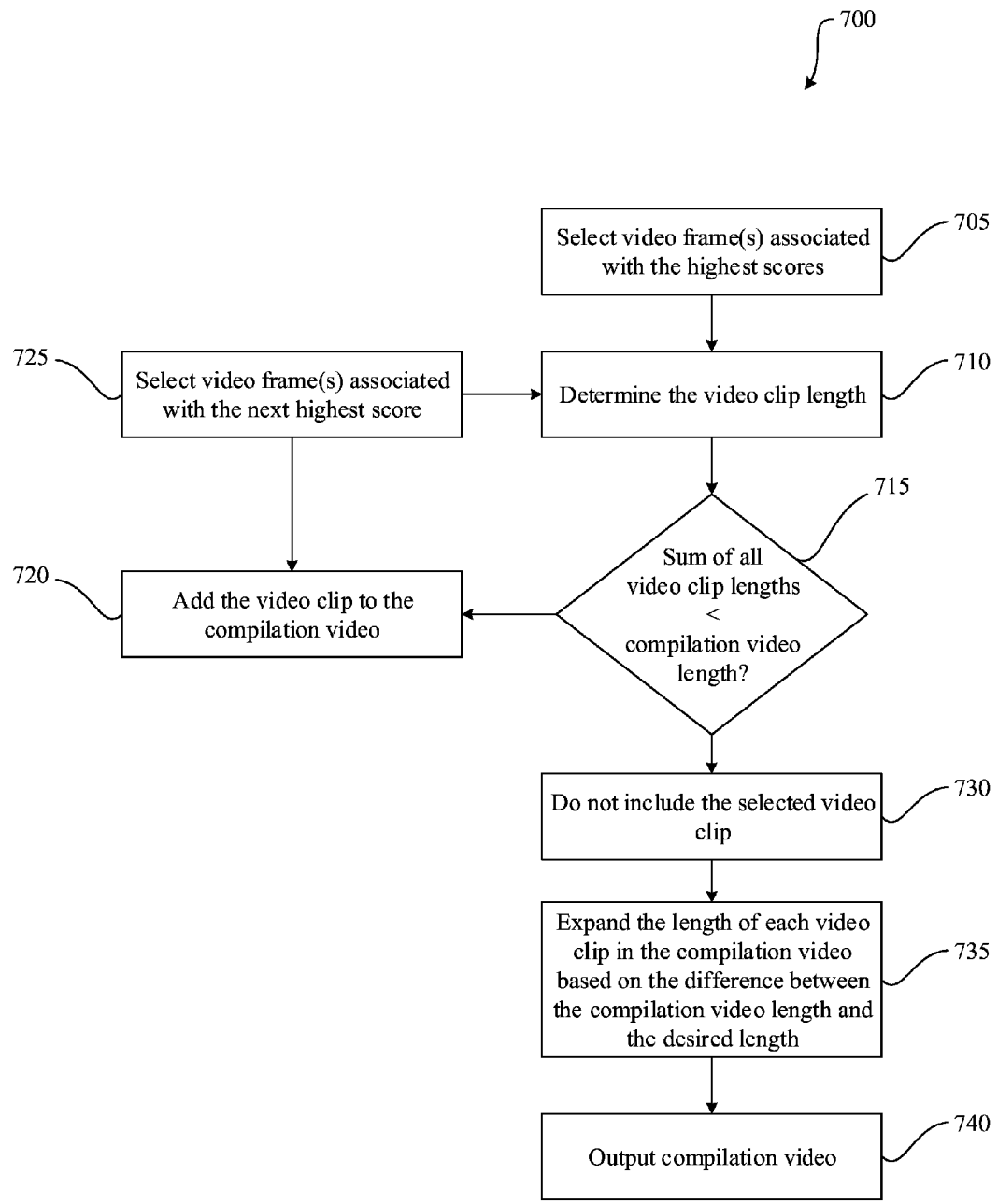
FIG. 7 illustrates an example flowchart of a process for creating a compilation video according to some embodiments described herein.

FIG. 7 illustrates an example flowchart of a process 700 for creating a compilation video from one or more original videos according to some embodiments described herein. The process 700 may be executed by the controller 120 of the camera 110 or by any computing device. In some embodiments, block 620 of the process 600 shown in FIG. 6 may include all or many of the blocks of the process 700. The process 700 starts at block 705.

At block 705, the video frames associated with the highest relevance score may be selected. The selected frame(s) may include a single frame or a series of frames. If multiple frames have the same relevance score and are not linked together in time series (e.g., the multiple frames do not include a continuous or mostly continuous video clip), then one of these highest scoring frames are selected either randomly or based on being first in time.

At block 710, the length of a video clip is determined. For example, the length of the video clip may be determined based on the number of video frames in time series that are selected as a group or have similar relevance scores or have relevance scores within a threshold. It may also include, for example, video frames that are part of head video frames or tail video frames. The length of the video clip may be based at least in part on metadata. The length of the video clip may be determined by referencing a default video clip length stored in memory.

At block 715 it may be determined whether the sum of all the video clip lengths is greater than the compilation video length. For example, at block 715, it may be determined whether there is room in the compilation video for the selected video clip. If there is room, then the video clip is added to the compilation video at block 720. For example, the video clip may be added at the beginning, the end, or somewhere in between other video clips of the compilation video. At block 725, video frames with the next highest scores are selected and the process 700 proceeds to block 710 with the newly selected video clips.

If, however, at block 715 it is determined that there is no room for the video clip in the compilation video, then the process 700 proceeds to block 730 where the video clip is not entered into the compilation video. At block 735, the length of one or more video clips in the compilation video may be expanded to ensure the length of the compilation video is the same as the desired length of the compilation video. For example, if the difference between the length of the compilation video and the desired length of the compilation video is five seconds, which equals 120 frames at 24 frames per second, and if the compilation video comprises ten video clips, then each of the ten video clips may be expanded by 12 frames. The six proceeding frames from the original video may be added to the front of each video clip in the compilation video and the six following frames from the original video may be added to the end of each video clip in the compilation video. Alternatively or additionally, frames may only be added to the front or the back end of a video clip.

In some embodiments block 735 may be skipped and the compilation video length may not equal the desired compilation video length. In other embodiments, rather than expanding the length of various video clips, the process 700 may search for a highly scored video clip within the original video(s) having a length that is less than or equal to the difference between the compilation video length and the desired compilation video length. In other embodiments, the selected video clip may be shortened in order to fit within the compilation video.

At block 740 the compilation video may be output as described above in conjunction with block 520 of the process 500 shown in FIG. 5.

Figure 8:
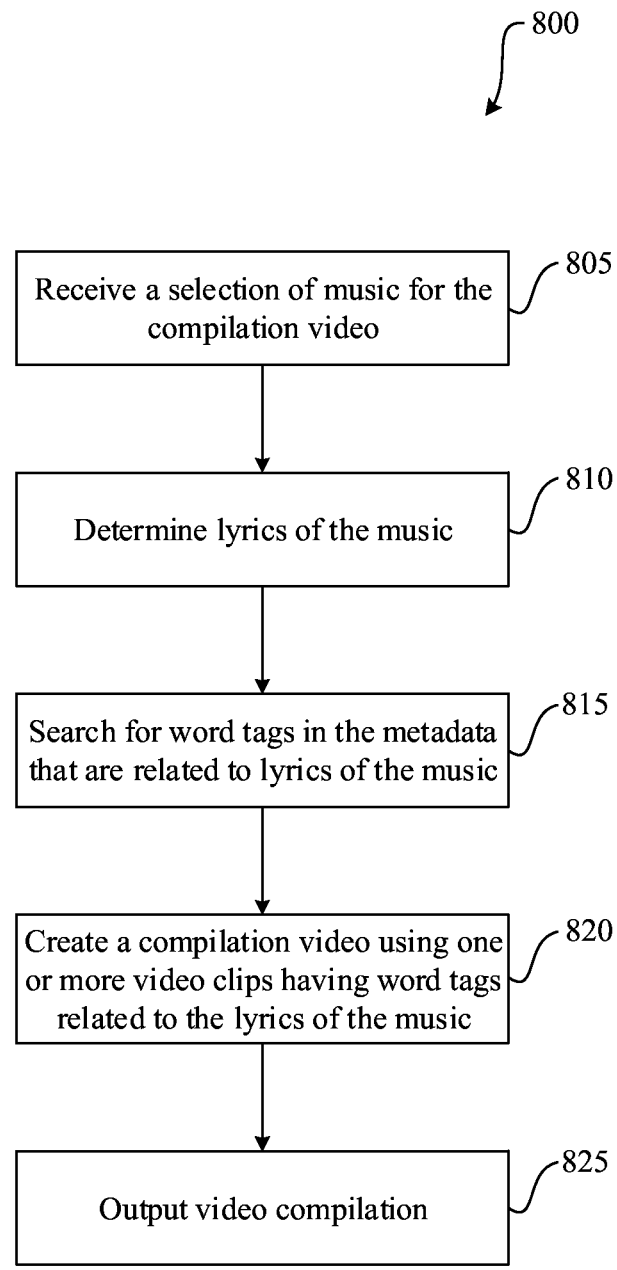
FIG. 8 illustrates an example flowchart of a process for creating a compilation video using music according to some embodiments described herein.

FIG. 8 illustrates an example flowchart of a process 800 for creating a compilation video from an original video using music according to some embodiments described herein. The process 800 may be executed by the controller 120 of the camera 110 or by any other computing device. The process 800 may start at block 805.

At block 805, a selection of music for the compilation video may be received. The selection of the music may be received, for example, from a user through the user interface 145. The selection of music may include a digital audio file of the music indicated by the selection of music. The digital audio file may be uploaded or transferred via any wireless or wired method, for example, using a Wi-Fi transceiver.

At block 810, lyrics for the selection of music may be determined and/or received. For example, the lyrics may be received from a lyric database over a computer network. The lyrics may also be determined using voice recognition software. In some embodiments, all the lyrics of the music may be received. In other embodiments only a portion of the lyrics of the music may be received. And, in yet other embodiments, instead of lyrics being received, keywords associated with the music may be determined and/or received.

At block 815, the process 800 may search for word tags in the metadata that are related to lyrics of the music. The word tags, for example, may be found as metadata in the voice tagging track 240. Alternatively and/or additionally, one or more audio tracks may be voice-transcribed and the voice transcription may be searched for words associated with one or more words in the lyrics or keywords associated with the lyrics. Alternatively and/or additionally, keywords related to the song or words within the title of the music lyrics may be used to find word tags in the metadata.

At block 820 a compilation video may be created using one or more video clips having word tags related to the lyrics of the music. All or portions of the process 600 may be used to create the compilation video. Various other techniques may be used. At block 825 the compilation video may be output as described above in conjunction with block 520 of the process 500.

In some embodiments, the original videos discussed in processes 500, 600, 700, and/or 800 may include video clips, full length videos, video frames, thumbnails, images, photos, drawings, etc.

In processes 500, 600, 700, and/or 800 original videos, images, photos, and/or music may be selected using a number of parameters. For example, a photo (image or video frame) may be selected based on the interestingness (or relevance or relevance score) of the photo. A number of factors may be used to determine the interestingness of photo such as, for example, user interaction with the photo (e.g., the user cropped, rotated, filtered, performed red-eye reduction, etc. on the photo), user ratings of the photo (e.g., IPTC rating, star rating, or thumbs up/down rating), face detection, face recognition, photo quality, focus, exposure, saturation, etc.

As another example, a video (or video clip) may be selected based on the interestingness (or relevance or relevance score) of the video. A number of factors may be used to determine the interestingness of the video such as, for example, telemetry changes in the video (e.g., accelerations, jumps, crashes, rotations, etc.), user tagging (e.g., the user may press a button on the video recorder to tag a video frame or a set of frames as interesting), motion detection, face recognition, user ratings of the video (e.g., IPTC rating, star rating, or thumbs up/down rating), etc.

As another example, a music track may be selected based on the interestingness (or relevance or relevance score) of the music track. A number of factors may be used to determine the interestingness of the music track such as, for example, whether the music is stored locally or whether it can be streamed from a server, the duration of the music track, the number of times the music has been played, whether the music track has been selected previously, user rating, skip count, the number of times the music track has been played since it has been released, how recently the music has been played, whether the music was played at or near recording the original video, etc.

Figure 9:
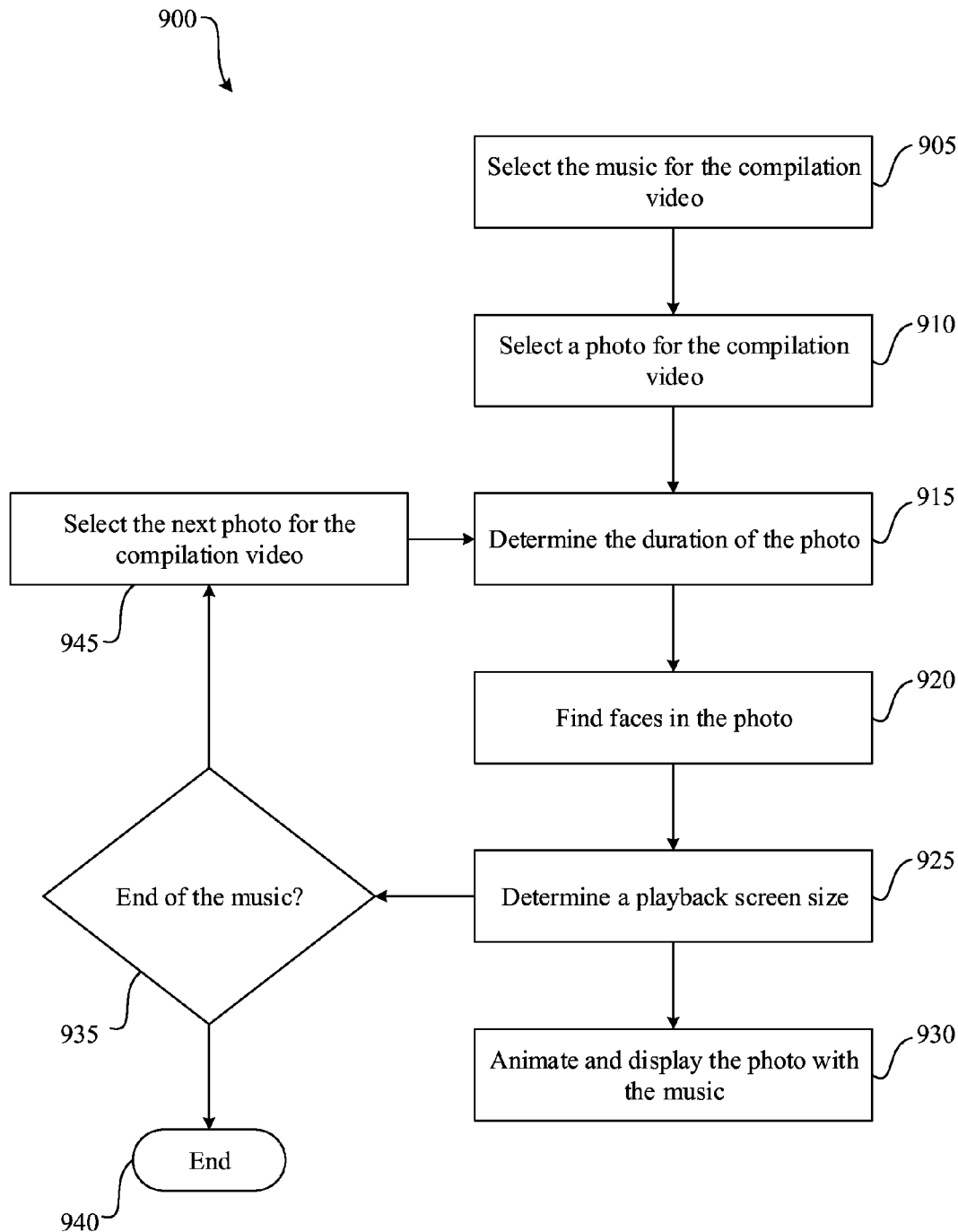
FIG. 9 illustrates an example flowchart of a process for creating a compilation video from an original video using music according to some embodiments described herein.

FIG. 9 illustrates an example flowchart of a process 900 for creating a compilation video from an original video using music according to some embodiments described herein. The process 900 may be executed by the controller 120 of the camera 110 or by any other computing device. The process 900 may start at block 905.

At block 905, a music track may be selected for the compilation video. The music track may be selected, for example, in a manner similar to that described in block 805 of process 800 or block 510 of process 500. The music may be selected, for example, based on how interesting the music is as described above. The music track, for example, may be selected based on a relevance score of the music track.

At block 910 a first photo may be selected for the compilation video. The first photo, for example, may be selected from a set of photos based on a relevance score of the photo.

At block 915 a duration may be determined for the first photo. The duration may affect the size or lengths of pans for Ken Burns effects. A shorter duration may speed up Ken Burns effects and a longer duration may allow for slower Ken Burns effects. The duration may be selected based on the number of photos from which the first photo was selected, the relevance score of the first photo, the length of the music track, or a number pulled from memory.

At block 920 faces may be found in the photo using facial detection techniques. A frame may be generated around any or all faces found in the photo. This frame may be used to keep the faces displayed during compilation video.

At block 925 a playback screen size may be determined from the frame generated around the faces. The playback screen size may also be determined based on a function of the screen size of the device and/or the orientation of the device screen.

At block 930 the photo may be animated with Ken Burns effects and displayed to the user with the music tack. The Ken Burns effects may vary from photo to photo based on any number factors such as, for example, random numbers, the relevance score of the photo, the playback screen size, the duration, a set number, etc. The photo may be animated and played with the music track.

Simultaneously while the photo is being animated and displayed, process 900 proceeds to block 935 where it is determined whether the end of the music will be reached while the photo is being displayed. If so, then process 900 ends at the end of the music track at block 940. Alternatively and/or additionally, rather than ending at block 940, process 900 may return to block 905 where another music track is selected and process 900 repeats.

If, however, the end of the music track will not be reached while the photo is being displayed, then process 900 proceeds to block 945 where the next photo may be selected for the compilation video.

In some embodiments, photos may be sorted and/or ranked based on their relevance score. At block 945, for instance, the next relevance photo may be selected. In some embodiments, the relevance score may be dynamically updated as information changes and/or as photos are added to the photo set of photos such as, for example, when a photo is downloaded from a remote server or transferred from remote server, etc.

Process 900 may then proceed to block 915 with the next photo. Blocks 920, 925 and 930 may then act on the next photo as described above. In some embodiments, blocks 935, 945, 915, 920, and 925 may act on one photo while at block 930 another photo is being animated and displayed. In this way, for example, the compilation video may be animated and displayed in real time. Moreover, in some embodiments, blocks 915, 920 and 925 may occur simultaneously or in any order.

In some embodiments, the user may request that the music track selected in block 905 be replaced with another music track such as, for example, the next most relevant music track. The user, for example, may interact with user interface 145 (e.g., by pressing a button or swiping a touch screen) and in response another music track will be selected and played at block 930. Moreover, In some embodiments, the user may request that a photo is no longer animated and displayed at block 930 such as, for example, by interacting with user interface 145 (e.g., by pressing a button or swiping a touch screen).

Figure 10:
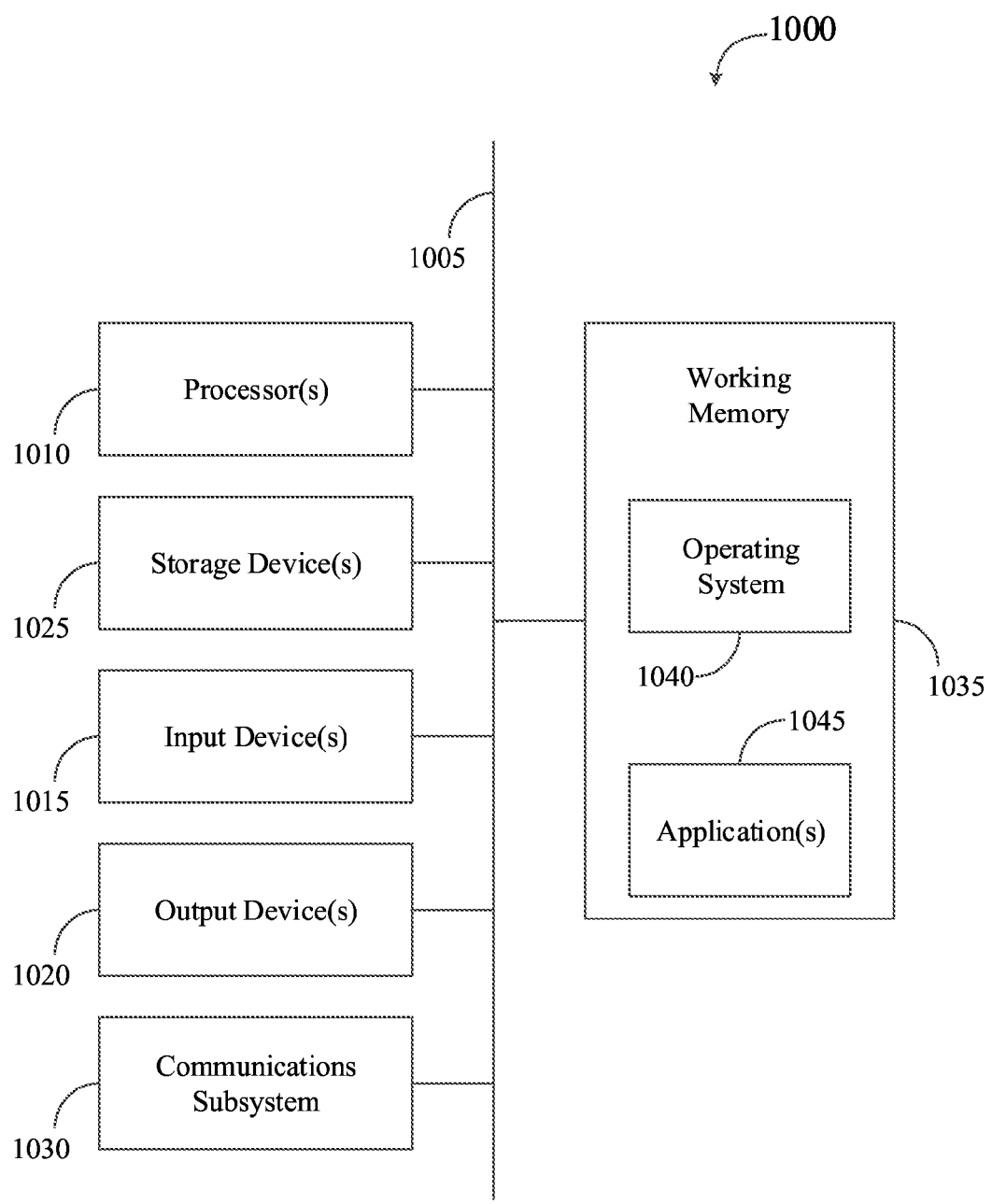
FIG. 10 shows an illustrative computational system 1000 for performing functionality to facilitate implementation of embodiments described herein.

A computational system 1000 (or processing unit) illustrated in FIG. 10 can be used to perform any of the embodiments of the invention. For example, the computational system 1000 can be used alone or in conjunction with other components to execute all or parts of the processes 500, 600, 700, 800 and/or 900. As another example, the computational system 1000 can be used to perform any calculation, solve any equation, perform any identification, and/or make any determination described here. The computational system 1000 includes hardware elements that can be electrically coupled via a bus 1005 (or may otherwise be in communication, as appropriate). The hardware elements can include one or more processors 1010, including, without limitation, one or more general purpose processors and/or one or more special purpose processors (such as digital signal processing chips, graphics acceleration chips, and/or the like); one or more input devices 1015, which can include, without limitation, a mouse, a keyboard, and/or the like; and one or more output devices 1020, which can include, without limitation, a display device, a printer, and/or the like.

The computational system 1000 may further include (and/or be in communication with) one or more storage devices 1025, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1000 might also include a communications subsystem 1030, which can include, without limitation, a modem, a network card (wireless or wired), an infrared communication device, a wireless communication device, and/or chipset (such as a Bluetooth device, a 1002.6 device, a Wi-Fi device, a WiMAX device, cellular communication facilities, etc.), and/or the like. The communications subsystem 1030 may permit data to be exchanged with a network (such as the network described below, to name one example) and/or any other devices described herein. In many embodiments, the computational system 1000 will further include a working memory 1035, which can include a RAM or ROM device, as described above. The memory 125 shown in FIG. 1 may include all or portions of the working memory 1035 and/or the storage device(s) 1025.

The computational system 1000 also can include software elements, shown as being currently located within the working memory 1035, including an operating system 1040 and/or other code, such as one or more application programs 1045, which may include computer programs of the invention and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some cases, the storage medium might be incorporated within the computational system 1000 or in communication with the computational system 1000. In other embodiments, the storage medium might be separate from the computational system 1000 (e.g., a removable medium, such as a compact disk, etc.), and/or provided in an installation package, such that the storage medium can be used to program a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. A method for creating a compilation video, the method comprising:
    determining a music relevance score of a music track of a plurality of music tracks based on: whether the music track is stored locally, whether the music track can be streamed from a server, a duration of the music track, a number representing how many times the music track has been played, whether the music track has been selected previously, a user rating, a skip count, a number representing how many times the music track has been played since the music track has been released, how recently the music track has been played, and whether the music track was played at or near recording the original video;
    selecting the music track from a plurality of music tracks;
    determining a first photo relevance score of a first photo of a plurality of photos based on: a date the first photo was taken, whether a user has digitally interacted with the first photo, a user rating associated with the first photo, whether the first photo includes particular faces, and a location where the first photo was taken;

selecting the first photo from the plurality of photos based on the first photo relevance score of the first photo;

animating the first photo by applying a first motion effect to the first photo;

displaying the animated first photo in conjunction with the music track;

determining a second photo relevance score of a second photo of the plurality of photos based on: a date the second photo was taken, whether a user has digitally interacted with the second photo, a user rating associated with the second photo, whether the second photo includes particular faces, and a location where the second photo was taken;

selecting the second photo from the plurality of photos based on the second photo relevance score of the second photo;

animating the second photo by applying a second motion effect to the second photo;

displaying a transition between the animated first photo and the animated second photo; and displaying the animated second photo in conjunction with the first music track.

2. The method according to claim 1, wherein the first motion effect comprises a Ken Burns effect.

3. The method according to claim 1, wherein the first motion effect comprises a panning, and/or zooming effect.

4. The method according to claim 1, further comprising:
selecting a subset of the plurality of photos based on a third relevance score of the subset of the plurality of photos;
animating each of the subset of the plurality of photos; and
displaying the animated subset of the plurality of photos in conjunction with the music track.

5. A non-transitory computer-readable medium having encoded therein programming code executable by a processor to perform operations comprising:
determining a music relevance score of a music track of a plurality of music tracks based on: whether the music track is stored locally, whether the music track can be streamed from a server, a duration of the music track, a number representing how many times the music track has been played, whether the music track has been selected previously, a user rating, a skip count, a number representing how many times the music track has been played since the music track has been released, how recently the music track has been played, and whether the music track was played at or near recording the original video;
selecting the music track from a plurality of music tracks;
selecting a first photo from a plurality of photos based on a first photo relevance score of the first photo;
animating the first photo by applying a first motion effect to the first photo;
displaying the animated first photo in conjunction with the first music track;
selecting a second photo from the plurality of photos based on a second relevance score of the second photo;
animating the second photo by applying a second motion effect to the second photo;
displaying a transition between the animated first photo and the animated second photo; and
displaying the animated second photo in conjunction with the first music track.

6. The non-transitory computer-readable medium according to claim 5, wherein the first photo relevance score of the first photo comprises a score that depends on one or more factors selected from a list consisting of: a date the first photo was taken, whether a user has digitally interacted with the first photo, a user rating associated with the first photo, a quality of the first photo, whether the first photo includes faces, whether the first photo includes particular faces, and a location where the first photo was taken.

7. The non-transitory computer-readable medium according to claim 5, wherein the second photo relevance score of the second photo comprises a score that depends on one or more factors selected from a list consisting of: a date the second photo was taken, whether a user has digitally interacted with the second photo, a user rating associated with the second photo, a quality of the second photo, whether the second photo includes faces, whether the second photo includes particular faces, and a location where the second photo was taken.

8. The non-transitory computer-readable medium according to claim 5, wherein the first motion effect comprises a Ken Burns effect.

9. The non-transitory computer-readable medium according to claim 5, wherein the first motion effect comprises a panning, and/or zooming effect.

10. The non-transitory computer-readable medium according to claim 5, further comprising:
selecting a subset of the plurality of photos based on a third relevance score of the subset of the plurality of photos;
animating each of the subset of the plurality of photos; and
displaying the animated subset of the plurality of photos in conjunction with the music track.

11. A mobile device comprising:
an image sensor;
a user interface;
a memory; and
a processing unit electrically coupled with the image sensor and the memory, wherein the processing unit is configured to:
select a first music track from a plurality of music tracks stored in the memory;
select a first photo from a plurality of photos stored in the memory based on a first relevance score of the first photo, wherein the first relevance score is based on a voice parameter that corresponds to a word spoken and recorded with respect to capture of the first photo and the voice parameter includes:
a voice tag parameter indicating that the word is an exclamatory word; and
a voice tone parameter indicating an excited tone of voice when the word was spoken;
animate the first photo by applying a first motion effect to the first photo;
display the animated first photo in conjunction with the first music track via the user interface;
select a second photo from the plurality of photos based on a second relevance score of the second photo;
animate the second photo by applying a second motion effect to the second photo;
display a transition between the animated first photo and the animated second photo; and
display the animated second photo in conjunction with the first music track via the user interface.

12. The mobile device according to claim 11, wherein the first relevance score of the first photo comprises a score that depends on one or more factors selected from a list consisting of: a date the first photo was taken, whether a user has digitally interacted with the first photo, a user rating associated with the first photo, a quality of the first photo, whether the first photo includes faces, whether the first photo includes particular faces, and a location where the first photo was taken.

13. The mobile device according to claim 11, wherein the second relevance score of the second photo comprises a score that depends on one or more factors selected from a] list consisting of: a date the second photo was taken, whether a user has digitally interacted with the second photo, a user rating associated with the second photo, a quality of the second photo, whether the second photo includes faces, whether the second photo includes particular faces, and a location where the second photo was taken.

14. The mobile device according to claim 11, wherein the first music track is selected based on a music relevance score.

15. The mobile device according to claim 11, wherein the first music track is selected based on a music relevance score that depends on one or more factors selected from a list consisting of: whether the first music track is stored locally, whether the first music track can be streamed from a server, a duration of the first music track, a number representing how many times the first music track has been played, whether the first music track has been selected previously, a user rating, a skip count, a number representing how many times the first music track has been played since the first music track has been released, how recently the first music track has been played, and whether the first music track was played at or near recording the original video.

16. The mobile device according to claim 11, wherein the first motion effect comprises a Ken Burns effect.

17. The mobile device according to claim 11, wherein the first motion effect comprises a panning, and/or zooming effect.

18. The mobile device according to claim 11, wherein the processing unit is further configured to:
- select a subset of the plurality of photos based on a third relevance score of the subset of the plurality of photos;
- animate each of the subset of the plurality of photos; and
- display the animated subset of the plurality of photos in conjunction with the first music track via the user interface.

* * * * *

UNITED STATES PATENT AND TRADEMARK OFFICE
CERTIFICATE OF CORRECTION

PATENT NO. : 9,779,775 B2
APPLICATION NO. : 14/188431
DATED : October 3, 2017
INVENTOR(S) : Pacurariu et al.

Page 1 of 1

It is certified that error appears in the above-identified patent and that said Letters Patent is hereby corrected as shown below:

In the Claims

In Column 23, Line 10, in Claim 13, delete "a]" and insert --a-- therefor

Signed and Sealed this
Eighteenth Day of June, 2019

Andrei Iancu
*Director of the United States Patent and Trademark Office*